No. 625,111. Patented May 16, 1899.
W. LANE & A. DONEY.
CHANGEABLE GEAR FOR BICYCLES.
(Application filed Mar. 14, 1898.)
(No Model.)
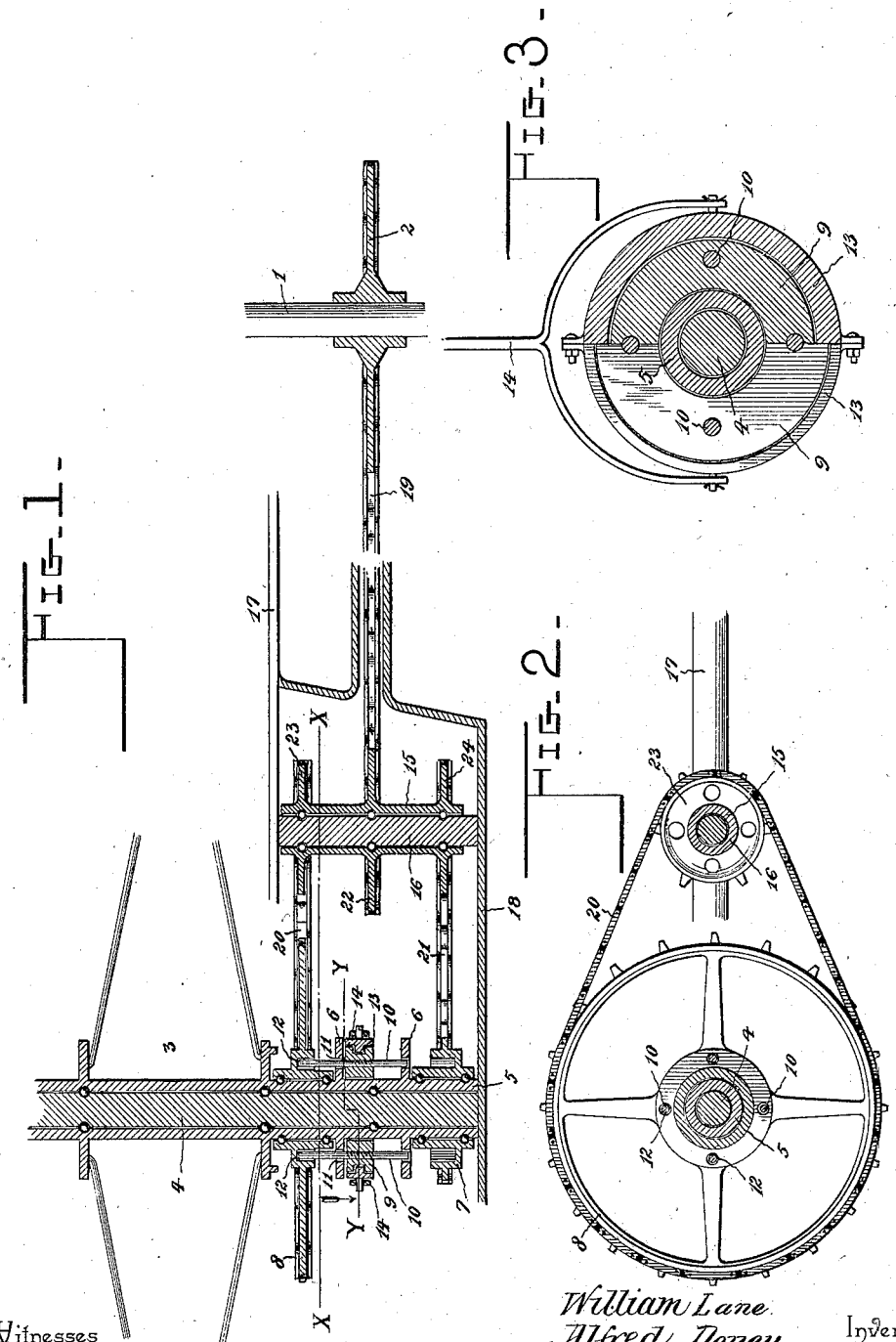
Witnesses
John F. Scufferwiel
V. B. Hillyard.
William Lane
Alfred Doney
Inventors
By Their Attorneys,
C. A. Snow & Co.

United States Patent Office.

WILLIAM LANE AND ALFRED DONEY, OF PEN ARGYL, PENNSYLVANIA, ASSIGNORS OF ONE-THIRD TO LEONIDAS W. MORSS, OF SCRANTON, PENNSYLVANIA.

CHANGEABLE GEAR FOR BICYCLES.

SPECIFICATION forming part of Letters Patent No. 625,111, dated May 16, 1899.

Application filed March 14, 1898. Serial No. 673,824. (No model.)

*To all whom it may concern:*

Be it known that we, WILLIAM LANE and ALFRED DONEY, citizens of the United States, residing at Pen Argyl, in the county of Northampton and State of Pennsylvania, have invented a new and useful Changeable Gear for Bicycles, of which the following is a specification.

Various means have been devised for adapting bicycles and road-machines of kindred nature for speed or power, so as to enable the rider to climb a hill with as much ease as propelling the machine over a level road. This invention pertains to propelling mechanism of this type and aims to devise a changeable gearing which can be applied to any of the various makes and patterns of machines without requiring a reconstruction of the framework in order to equip the machine with a propelling mechanism constructed in accordance with the principles of this invention.

In its organization the propelling mechanism comprises a triple sprocket-gear interposed between the crank-axle and the axle of the drive-wheel and connected with the crank-axle, so as to receive power therefrom. The hub of the drive-wheel is extended, and sprocket-gears of different diameters are loosely mounted thereon and connected by sprocket-chains with the end gears of the triple sprocket-gear, and a clutch mechanism is located intermediate of the differential sprocket-gear and is keyed to the hub of the drive-wheel, so as to rotate therewith, and is adapted to be shifted so as to bring either one of the differential sprocket-gears into active operation, so as to adapt the machine for speed or power, as required.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a detail plan section of a changeable propelling mechanism embodying the vital features of this invention. Fig. 2 is a longitudinal section on the line X X of Fig. 1, looking in the direction of the arrow. Fig. 3 is a detail section on the line Y Y of Fig. 1, viewed in the direction of the arrow.

Corresponding and like parts are referred to in the following description and indicated in the several views of the drawings by the same reference characters.

The crank-axle 1, with its sprocket-gear 2, the drive-wheel 3, and the drive-wheel axle 4, are well-known parts of a bicycle and are illustrated to show the application of the invention.

The axle 4 is extended at one end, and the hub of the drive-wheel is similarly extended, as shown at 5, and is formed with annular flanges or rims 6 at an intermediate point and spaced apart. A sprocket-gear 7 is loosely mounted upon the outer end portion of the extended hub 5, and a corresponding sprocket-gear 8 is similarly mounted upon the inner end of the hub extension, the sprocket-gears 7 and 8 being of different diameters to secure speed or power, as required. A sleeve 9 is loosely mounted upon the hub extension 5 between the annular flanges 6 and is provided with threaded openings in which are fitted pins 10, which have their end portions projected from opposite sides of the sleeve and adapted to work loosely through openings 11, formed in the flanges 6. The inner faces of the sprocket-gears 7 and 8 have recesses or openings 12 formed therein for the reception of the end portions of the pins 10, whereby either sprocket-gear is adapted to be secured to the hub of the drive-wheel, so as to rotate therewith. The pins 10 serve a dual purpose—namely, to connect the clutch-sleeve 9 with the flanges 6 of the hub extension 5, whereby the drive-wheel and clutch-sleeve rotate in unison under all conditions, and to bring either one of the sprocket-gears 7 and 8 into active operation.

The clutch-sleeve may be moved in any of the usual ways and is provided with a yoke 13, composed of parts secured about the sleeve 9 and a shipper-lever 14, the latter being forked and having its forked members in engagement with the opposite sides of the yoke. This lever extends within convenient reach of the rider, so as to be operated for shifting the clutch and bringing either of the sprocket-gears into clutched engagement with the drive-wheel.

A triple sprocket-gear 15 is located intermediate of the crank-axle 1 and the extended end of the drive-wheel hub and is mounted upon an axle 16, secured to a side bar 17 of the machine-frame, and a bracket or housing 18, made fast in any suitable manner to the said side bar. A sprocket-chain 19 connects the middle gear with the sprocket-gear 2, and drive-chains 20 and 21 connect the end gears of the part 15 with the sprocket-gears 8 and 7, respectively. The middle gear 22 of the triple gear is of larger diameter than the end gears 23 and 24, and the component parts of the triple gear being connected with the sprocket-gears 2, 7, and 8 these parts rotate continuously when the machine is in motion, and by shifting the clutch-sleeve either one of the differential gears 7 and 8 can be brought into operation and the machine propelled to suit the strength of the rider and the nature of the surface or road over which the machine is traveling. As indicated, ball-bearings are interposed between the rotating elements and their supports, so as to reduce the friction to the smallest amount possible, whereby a maximum amount of the power expended may be available for propelling the machine. When coasting, the clutch is shifted to an intermediate point, thereby throwing the crank-axle and the train of gearing below it and the drive-wheel out of action, these parts remaining stationary while the machine is propelled by gravity.

Having thus described the invention, what is claimed as new, and desired to be secured by Letters Patent, is—

In changeable gearing for bicycles and the like, the combination of a drive-wheel having its hub extended at one end and provided with annular flanges spaced apart, differential sprocket-gears loosely mounted upon the end portions of the hub extension, a clutch-sleeve mounted upon the hub extension, intermediate of the flanges thereof, pins applied to the clutch-sleeve and working through openings of the aforesaid flanges and adapted to enter recesses or openings in the differential gears, a triple sprocket-gear between the crank-axle and the hub extension of the drive-wheel, sprocket-chains connecting the end elements of the triple gear with the differential sprocket-gear, and a sprocket-chain connecting the middle element of the triple gear with the sprocket-wheel of the crank-axle, substantially as set forth for the purpose described.

In testimony that we claim the foregoing as our own we have hereto affixed our signatures in the presence of two witnesses:

WILLIAM LANE.
ALFRED DONEY.

Witnesses:
 N. D. CHASE,
 FREDERICK HUSSEY.